(12) United States Patent
Nakagawa

(10) Patent No.: US 11,301,962 B2
(45) Date of Patent: Apr. 12, 2022

(54) IMAGE PROCESSING METHOD, IMAGE PROCESSING APPARATUS, AND MEDIUM

(71) Applicant: CANON KABUSHIKI KAISHA, Tokyo (JP)

(72) Inventor: Daiki Nakagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/893,455

(22) Filed: Jun. 5, 2020

(65) Prior Publication Data

US 2020/0302577 A1    Sep. 24, 2020

Related U.S. Application Data

(63) Continuation of application No. PCT/JP2018/044657, filed on Dec. 5, 2018.

(30) Foreign Application Priority Data

Dec. 13, 2017  (JP) .............................. JP2017-238229
Oct. 3, 2018  (JP) .............................. JP2018-188180

(51) Int. Cl.
G06T 5/00 (2006.01)

(52) U.S. Cl.
CPC .... G06T 5/002 (2013.01); *G06T 2207/20182* (2013.01)

(58) Field of Classification Search
CPC ......... G06T 3/4038; G06T 5/002; G06T 5/20; G06T 5/10; G06T 5/50; G06T 5/00;

(Continued)

(56) References Cited

U.S. PATENT DOCUMENTS

| 2014/0355892 A1* | 12/2014 | Moon ................... G06K 9/6215 382/220 |
| 2015/0093041 A1* | 4/2015 | Kang ...................... G06T 5/002 382/275 |
| 2015/0187053 A1* | 7/2015 | Chen ......................... G06T 5/20 382/264 |

(Continued)

FOREIGN PATENT DOCUMENTS

| JP | 2008-026998 A | 2/2008 |
| JP | 2013-026669 A | 2/2013 |

OTHER PUBLICATIONS

Jan. 8, 2019 International Search Report in International Patent Appln. No. PCT/JP2018/044657.

(Continued)

*Primary Examiner* — Jose L Couso
(74) *Attorney, Agent, or Firm* — Venable LLP

(57) ABSTRACT

There is provided with an image processing apparatus. A focused patch setting unit sets a focused patch in an input image. The focused patch has a first number of pixels. A detecting unit detects a plurality of similar patches that are similar to the focused patch in the input image. A target patch setting unit sets, based on the plurality of similar patches, a plurality of target patches including at least one pixel included in the similar patch and having a second number of pixels that is different from the first number of pixels. A noise reduction processing unit performs, based on the plurality of target patches, a noise reduction process on the target patches. A merging unit merges the target patches whose noise has been reduced by the noise reduction processing unit to generate an output image.

19 Claims, 8 Drawing Sheets

(58) Field of Classification Search
CPC .......... G06T 5/001; G06T 7/337; G06T 7/90; G06T 7/00; G06T 7/223; G06T 2207/20021; G06T 2207/20012; G06T 2207/20182; G06T 2207/20024; G06T 2207/10004; G06T 2207/10024; G06T 2207/20076; G06T 2207/20192; G06T 2207/10016; H04N 5/21; H04N 5/357; H04N 5/213; H04N 5/911; H04N 5/2351; H04N 1/409; H04N 1/58; H04N 1/6027; H04N 7/102; H04N 9/04517; H04N 9/04557; H04N 19/33; H04N 19/176; H04N 19/117; G06K 9/40; G06K 9/4642; G06K 9/6215

See application file for complete search history.

(56) References Cited

U.S. PATENT DOCUMENTS

| | | | |
|---|---|---|---|
| 2016/0148385 A1* | 5/2016 | Koshiba | G06T 5/002 382/165 |
| 2017/0188038 A1* | 6/2017 | Chen | G06T 5/50 |
| 2017/0278224 A1* | 9/2017 | Onzon | G06T 5/002 |
| 2019/0188829 A1* | 6/2019 | Wei | H04N 19/55 |
| 2020/0267339 A1* | 8/2020 | Douady-Pleven | H04N 19/503 |
| 2020/0342573 A1 | 10/2020 | Higaki et al. | |
| 2021/0082089 A1 | 3/2021 | Takada | |

OTHER PUBLICATIONS

Kazumi Kawashima, et al., "Image Resolution Enhancement Using Cross Shaped Fractal," Transactions of the Institute of Electronics, Information and Communication Engineers, vol. J94-D, No. 4, Apr. 2011, pp. 742-745.

Kenta Kakumitsu, et al., "IFS Image Segmentation Using Pixel Multiplicity," IEICE Technical Report, vol. 100, No. 556, Jan. 2001, pp. 117-122.

Seichi Otsuki, et al., "Fractal Image Coding with Regional Division of a Block," Transactions of the Institute of Electronics, Information and Communication Engineers, vol. J87-A, No. 7, Jul. 2004, pp. 1027-1033.

* cited by examiner

IMAGE PROCESSING METHOD, IMAGE PROCESSING APPARATUS, AND MEDIUM

CROSS-REFERENCE TO RELATED APPLICATIONS

This application is a Continuation of International Patent Application No. PCT/JP2018/044657, filed Dec. 5, 2018, which claims the benefit of Japanese Patent Applications No. 2017-238229, filed Dec. 13, 2017, and No. 2018-188180, filed Oct. 3, 2018, all of which are hereby incorporated by reference herein in their entirety.

BACKGROUND OF THE INVENTION

Field of the Invention

The present invention relates to an image processing technique for reducing noise included in an input image.

Description of the Related Art

In the related art, a noise reduction process for reducing noise included in an image is known in relation to an image obtained through image capturing with an image capturing apparatus. Japanese Patent Laid-Open No. 2013-026669 discloses a method of generating a patch set from a captured image, performing a noise reduction process on all patches belonging to the patch set, and performing a merging process on the patches having undergone the noise reduction process.

SUMMARY OF THE INVENTION

According to an embodiment of the present invention, an image processing apparatus comprises: a focused patch setting unit configured to set a focused patch in an input image, the focused patch having a first number of pixels; a detecting unit configured to detect a plurality of similar patches that are similar to the focused patch in the input image; a target patch setting unit configured to set, based on the plurality of similar patches, a plurality of target patches including at least one pixel included in the similar patch and having a second number of pixels that is different from the first number of pixels; a noise reduction processing unit configured to perform, based on the plurality of target patches, a noise reduction process on the target patches; and a merging unit configured to merge the target patches whose noise has been reduced by the noise reduction processing unit to generate an output image.

According to another embodiment of the present invention, a non-transitory computer-readable medium stores a program which, when executed by a computer comprising a processor and a memory, causes the computer to perform: setting a focused patch in an input image, the focused patch having a first number of pixels; detecting a plurality of similar patches that are similar to the focused patch in an input image; setting, based on the plurality of similar patches, a plurality of target patches including at least one pixel included in the similar patch and having a second number of pixels that is different from the first number of pixels; performing, based on the plurality of target patches, a noise reduction process on the target patches; and merging the target patches whose noise has been reduced to generate an output image.

According to still another embodiment of the present invention, an image processing method comprises: setting a focused patch in an input image, the focused patch having a first number of pixels; detecting a plurality of similar patches that are similar to the focused patch in an input image; setting, based on the plurality of similar patches, a plurality of target patches including at least one pixel included in the similar patch and having a second number of pixels that is different from the first number of pixels; performing, based on the plurality of target patches, a noise reduction process on the target patches; and merging the target patches whose noise has been reduced to generate an output image.

Further features of the present invention will become apparent from the following description of exemplary embodiments with reference to the attached drawings.

DESCRIPTION OF THE EMBODIMENTS

In a patch-based noise reduction method of the related art, a plurality of similar patches that are similar to a focused patch subjected to processing are detected as a patch set in a captured image. At this time, the detection accuracy of similar patches increases as the number of pixels of a focused patch increases. On the other hand, in a noise reduction process performed on a patch set, the noise reduction process may not be appropriately performed on each patch if the number of pixels of the patch is large relative to the number of patches included in the patch set.

An embodiment of the present invention can appropriately perform detection of similar patches and a noise reduction process on each patch in a patch-based noise reduction process.

Embodiments of the present invention will be described below with reference to the drawings. Note that configurations described in embodiments below are merely examples and the present invention is not necessarily limited to the illustrated configurations.

Figure 1:
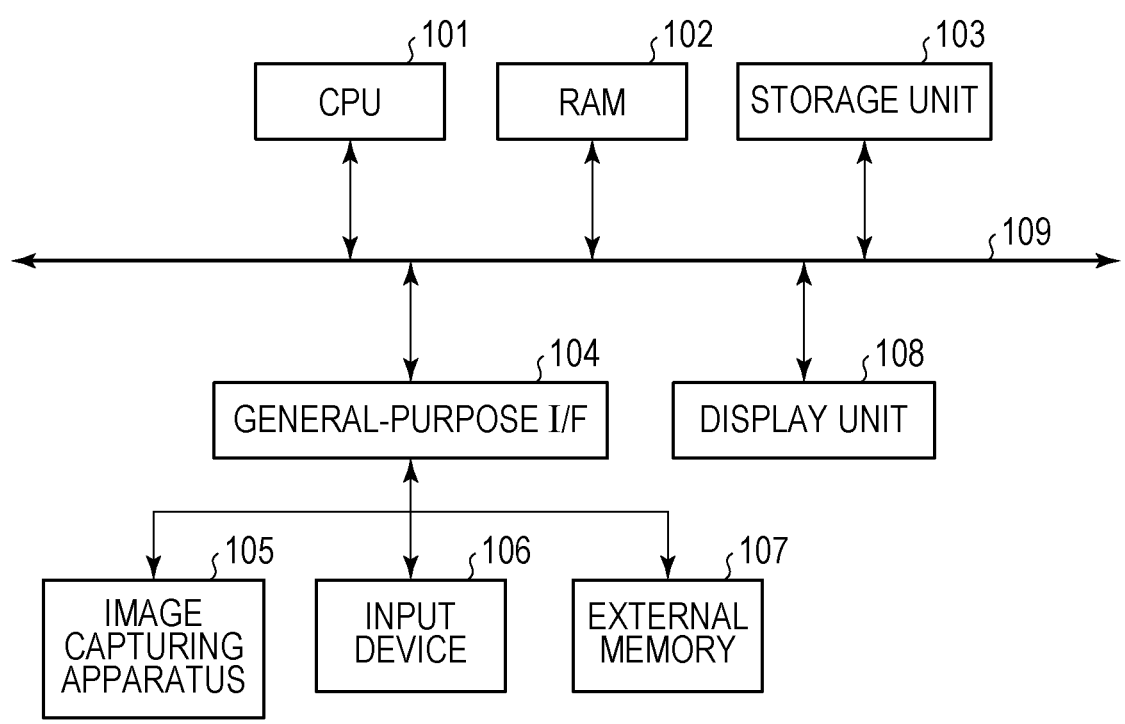
FIG. 1 is a block diagram illustrating a hardware configuration of an image processing apparatus.

In a first embodiment, an image processing apparatus that performs a patch-based noise reduction process will be described. The patch-based noise reduction process includes a process of detecting similar patches that are similar to a focused patch, and a process of reducing noise in each patch by using the detected similar patches. In the present embodiment, each of the number of pixels constituting a patch for use in detection of similar patches and the number of pixels constituting a patch for use in reduction of noise of each patch is appropriately set. FIG. 1 is a block diagram illustrating a hardware configuration of an image processing apparatus according to the present embodiment. The image processing apparatus includes a CPU 101, a RAM 102, a storage unit 103, a general-purpose I/F (interface) 104, and a display unit 108. The individual components are connected to one another via a main bus 109. The image processing apparatus is connected to an image capturing apparatus 105, an input device 106, and an external memory 107 via the general-purpose I/F 104. The input device 106 is, for example, a device such as a mouse or a keyboard which is used by a user to give instructions to the image processing apparatus.

The CPU 101 controls the individual components in accordance with an input image and a program described later. The storage unit 103 is a storage device such as an HDD or an SSD. The storage unit 103 stores a computer program causing the CPU 101 to execute various configurations. The RAM 102 is used as a buffer memory that temporarily holds input image data or the like, as a work space of the CPU 101, and so on. The CPU 101 interprets the program stored in the storage unit 103, causing the image processing apparatus to operate based on instructions. The display unit 108 is a liquid crystal display, an organic EL display, or the like. The display unit 108 displays an image and a user interface (UI) through which a user inputs a desired instruction. The image processing apparatus performs a noise reduction process on an image stored in the RAM 102 in accordance with an instruction from a user which is input via the display unit 108. In addition, the image having undergone the noise reduction process is stored in the RAM 102 again. The image that has undergone the noise reduction process and that is stored in the RAM 102 is output to the display unit 108 or the external memory 107 in accordance with an instruction from a user.

Figure 2:
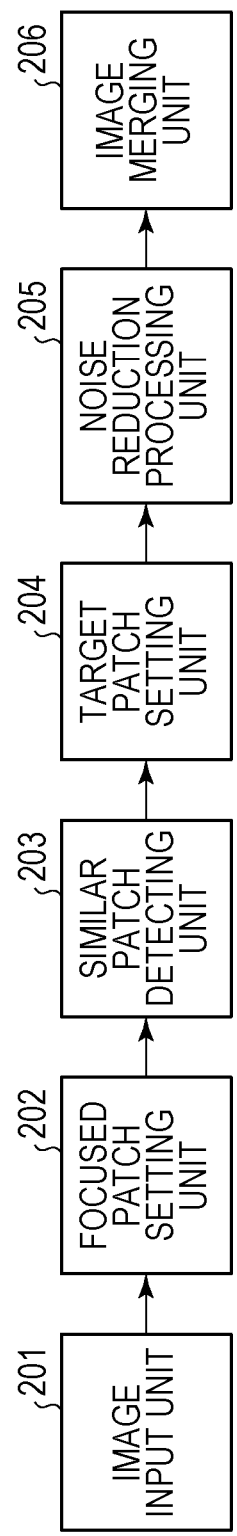
FIG. 2 is a block diagram illustrating a detailed logic configuration of the image processing apparatus.

The overview of a patch-based noise reduction process will now be described. In relation to a focused pixel in an input image, a patch constituted by a plurality of pixels relative to the focused pixel is referred to as a focused patch. Each of a plurality of pixels near the focused pixel is referred to as a reference pixel, and a patch corresponding to each reference pixel is referred to as a reference patch. A reference patch is a patch constituted by a plurality of pixels relative to a reference pixel. A reference patch is referred to when the noise reduction process is performed on a focused patch. Since a plurality of reference pixels are set for a single focused pixel, there are a plurality of reference patches for a single focused pixel. In the patch-based noise reduction process, similar patches which are patches having a pixel value distribution similar to that of the focused patch are detected from among reference patches to generate a similar patch group (patch set). Note that a similar patch is a patch constituted by the same number of pixels as that of the focused patch. In addition, the similar patch group may include the focused patch itself. The noise reduction process for reducing noise of each patch included in a similar patch group is then performed based on the similar patch group. The similar patches in which noise has been reduced are merged to generate an image which is the input image on which the noise reduction process has been performed. Note that a patch indicates a region equivalent to a part of an input image. In addition, a patch indicates a pixel group constituted by a plurality of pixels. FIG. 2 is a block diagram illustrating a detailed logic configuration of the image processing apparatus that performs the noise reduction process. The image processing apparatus includes an image input unit 201, a focused patch setting unit 202, a similar patch detecting unit 203, a target patch setting unit 204, a noise reduction processing unit 205, and an image merging unit 206. The image input unit 201 receives image data representing an input image which is a processing target of the noise reduction process. It is assumed that the input image is images of R (red), G (green), and B (blue). An image corresponding to each of the colors is constituted by pixels having 8-bit pixel values of 0 to 255.

The focused patch setting unit 202 sets a focused patch in the input image. The shape of the focused patch is set in advance. In the present embodiment, pixels of the input image are each set as the focused pixel in a rasterization order, and an 8-pixel×8-pixel quadrangular region including the focused pixel is set as the focused patch.

The similar patch detecting unit 203 sets a plurality of reference patches near the focused pixel, and selects, as similar patches, patches that are similar to the focused patch from among these reference patches to detect similar patches. Note that, in the present embodiment, the similar patch detecting unit 203 selects a plurality of reference patches as similar patches. Specifically, first, the similar patch detecting unit 203 sequentially sets as a reference pixel a certain pixel located near the focused pixel and included in a predetermined range, and sets a reference patch for the reference pixel in a manner similar to that of the focused patch. Then, the similar patch detecting unit 203 derives degrees of similarity between the focused patch and the individual reference patches, and determines whether each of the reference patches is similar to the focused patch. If the similar patch is similar to the focused patch, the similar patch detecting unit 203 selects the reference patch as the similar patch. In this case, 15 pixels×15 pixels centered at the focused pixel are set as the predetermined range in which the reference pixels are set. Thus, the similar patch detecting unit 203 sets 225 pixels including the focused pixel as the reference pixels and detects 225 similar patches at maximum. The detected similar patches have the same size as the focused patch. Therefore, in the present embodiment, the similar patches are quadrangular patches each constituted by 8 pixels×8 pixels.

The target patch setting unit 204 adjusts the number of pixels of the detected similar patches to set target patches used in noise reduction. Although the details will be described later, as the number of pixels of the focused patch increases, it becomes more unlikely to implement highly accurate noise reduction unless a subsequent process is performed using many similar patches. On the other hand, if the number of pixels of the focused patch is reduced for the highly accurate noise reduction process, the accuracy of detecting patches similar to the focused patch decreases. Accordingly, in the present embodiment, the target patch setting unit 204 adjusts a similar patch constituted by 8 pixels×8 pixels to a patch constituted by 4 pixel×4 pixels to set a target patch. As described above, in the present embodiment, the number of pixels of a patch used when similar patches are detected and the number of pixels of a patch used when the noise reduction process is performed on each patch are set to be different numbers of pixels. In this example, the target patch is set for each of all the detected similar patches. In addition, in this example, since a part of the similar patch is set as the target patch, a group of target patches can be regarded as patches similar to each other.

The noise reduction processing unit 205 reduces noise in each target patch based on the target patch group to generate a noise-reduced target patch group. The image merging unit 206 merges the noise-reduced target patch group to generate an output image having undergone the noise reduction process. The image merging unit 206 arranges each similar patch having undergone the noise reduction process to the original position in the input image. If the similar patch overlaps another corrected similar patch, the image merging unit 206 calculates an average value of values placed at the same pixel position. The image merging unit 206 updates the original pixel value of the pixel to the pixel value obtained as the result of the noise reduction process or to the average value to merge the noise-reduced target patch group. Such a merging process is referred to as aggregation.

Figure 3:
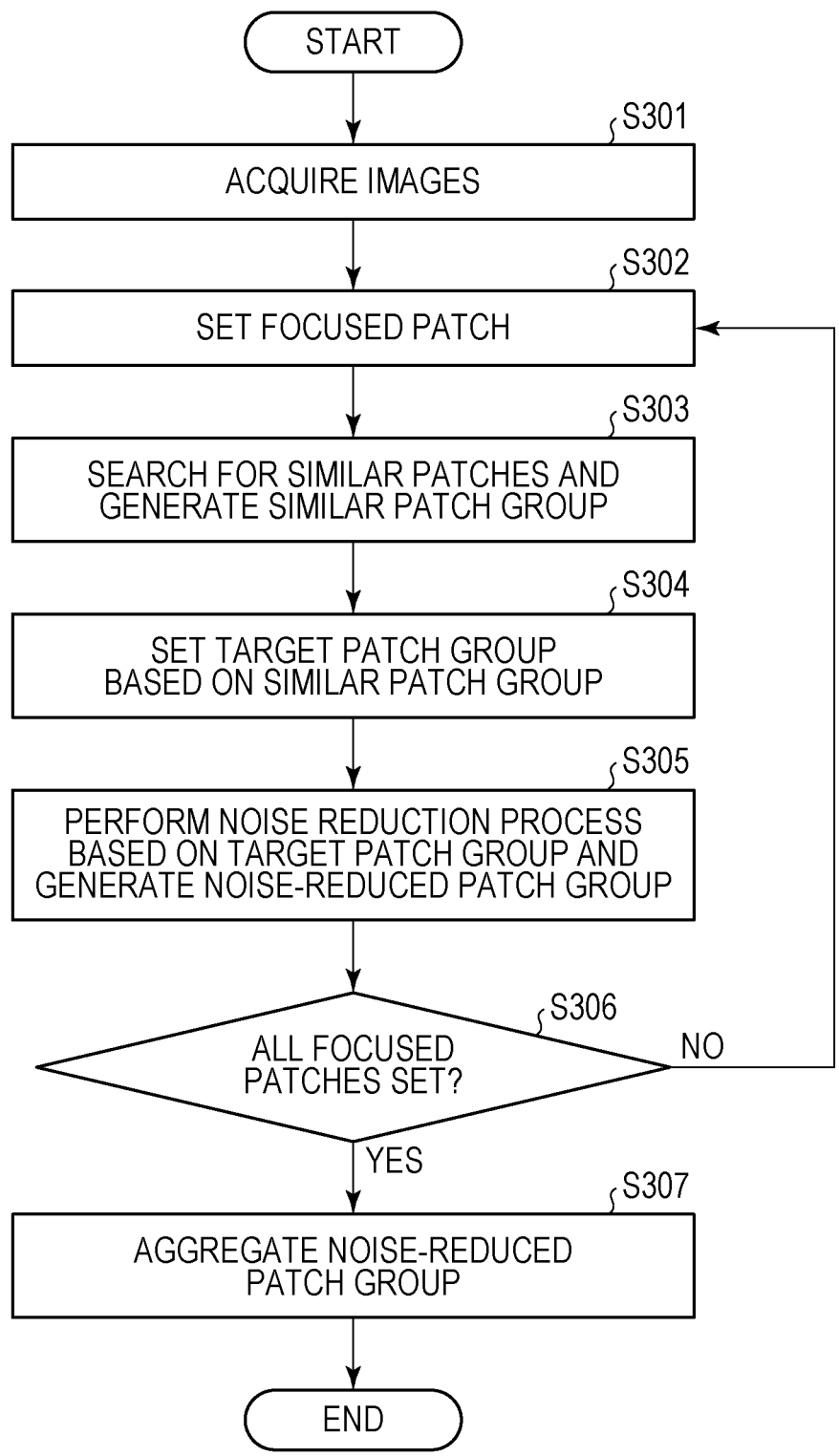
FIG. 3 is a flowchart illustrating a flow of a noise reduction process performed by the image processing apparatus.

Subsequently, a specific processing flow of the noise reduction process performed by the image processing apparatus described above will be described. FIG. 3 is a flowchart illustrating a flow of the noise reduction process according to the present embodiment. The CPU 101 reads out and executes a program for implementing the flowchart illustrated in FIG. 3. Note that each process (step) of the flowchart is represented using "S".

Figure 4A:
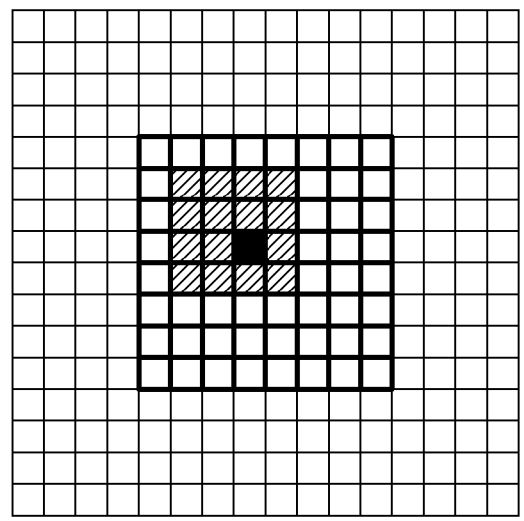
FIG. 4A is a diagram describing a focused pixel, a focused patch, a reference patch, and a target patch.

In S301, the image input unit 201 acquires images. As described above, images corresponding to R, G, and B are sequentially input. The following processing is performed on the images of the respective colors. In S302, the focused patch setting unit 202 sets a focused patch in the acquired image. The focused patch is constituted by a first number of pixels. As described before, in the present embodiment, a region of 8 pixels×8 pixels is set as the focused patch. FIG. 4A illustrates a positional relationship between a focused pixel and a focused patch in the present embodiment. Each quadrangle represents a pixel. In FIG. 4A, a pixel painted in black represents the focused pixel. When (x, y) denote the pixel position of the focused pixel, a 64-pixel region included in a quadrangle having four corners represented by (x−3, y−3), (x+4, y−3), (x−3, y+4), and (x+4, y+4) is set as the focused patch.

Figure 4B:
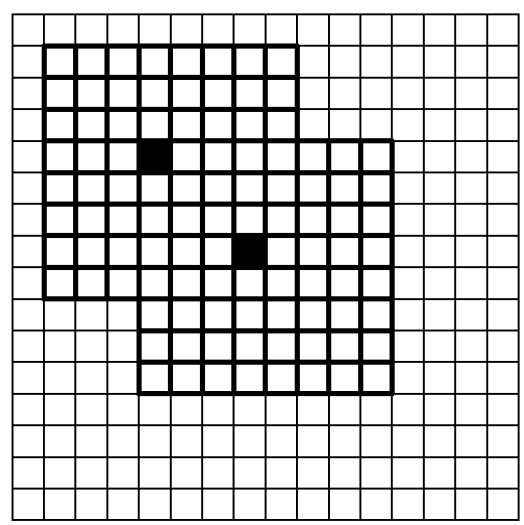
FIG. 4B is a diagram describing a focused pixel, a focused patch, a reference patch, and a target patch.

In S303, the similar patch detecting unit 203 detects patches similar to the focused patch on the basis of the focused patch. Specifically, first, the similar patch detecting unit 203 sequentially sets, as a reference pixel, each pixel that is located near the focused pixel and is included in a search range, and sets a reference patch for the reference pixel. The shape of each reference patch matches the shape of the focused patch. In the present embodiment, 15 pixels× 15 pixels centered at the focused pixel are set as a similar patch search range. For example, when (x, y) denotes the pixel position of the focused pixel and the pixel denoted by (x−3, y−3) is set as the reference pixel, a region of 8 pixels×8 pixels including the reference pixel is set as the reference patch as illustrated in FIG. 4B. It is determined whether or not the reference patch is similar to the focused patch depending on a degree of similarity between the focused patch and the reference patch. The degree of similarity is calculated by calculating, for each of the pixels in the focused patch and a corresponding pixel in the reference patch, a difference between pixel values of the pixels at the corresponding positions in the patches and calculating the sum of squared differences which is obtained by adding squares of the respective differences. Specifically, the similar patch detecting unit 203 calculates a sum of squared differences $SSD_i$ for an i-th reference patch by using Expression (1) below.

[Math. 1]

$$SSD_i = \|R_i - T\|^2 = \sum_{j=1}^{M} (R_i(j) - T(j))^2 \qquad (1)$$

$R_i(j)$ represents a j-th pixel value in the i-th reference patch. $T(j)$ represents a j-th pixel value in the focused patch T. By totalizing squares of differences between pixel values of two pixels located at the same pixel position in the patches, the sum of squared differences is calculated. In the case where the degree of similarity is calculated using the sum of squared differences $SSD_i$ in this manner, a smaller value of the degree of similarity indicates that the reference patch Ri is more similar to the focused patch T. That is, the smaller the value of the degree of similarity, the higher the degree of similarity. On the other hand, the larger the value of the degree of similarity, the less the reference patch Ri is similar to the focused patch T.

The similar patch detecting unit 203 determines that the reference patch is similar to the focused patch if the value of the degree of similarity for the reference patch is less than a predetermined threshold value, and detects the reference patch as the similar patch. On the other hand, the similar patch detecting unit 203 determines that the reference patch is not similar to the focused patch if the degree of similarity is greater than or equal to the predetermined threshold value. In this manner, the similar patch detecting unit 203 detects similar patches having features that are similar to those of the focused patch near the focused pixel. Note that since the search range is of 15 pixel×15 pixels, the determination of similarity is performed 225 times for a single focused patch. It is assumed that the similar patch detecting unit 203 detects N similar patches. The number of similar patches depends on whether or not each reference patch is similar to the focused patch. Therefore, in many cases, the number of similar patches changes if the focused patch changes.

In subsequent S304, the target patch setting unit 204 sets target patches for performing the noise reduction process, on the basis of the similar patch group. The target patch is constituted by a second number of pixels that is different from the first number of pixels for detecting similar patches. FIG. 4A illustrates a relationship among a similar patch detected in the present embodiment, a position of a target patch, and the numbers of pixels. The target patch is a patch set to correspond to each similar patch and has the number of pixels different from the number of pixels of the focused patch. As described above, the black pixel denotes the focused pixel. In this case, in the present embodiment, the target patch setting unit 204 sets a region of 4 pixels×4 pixels including the focused pixel and pixels hatched with diagonal lines as the target patch. That is, in the present embodiment, the target patch is a partial region of a patch that is similar to the focused patch. As described above, the target patch setting unit 204 sets the target patches for all the similar patches detected by the similar patch detecting unit 203. The number of target patches is equal to N just like the number of similar patches.

In S305, the noise reduction processing unit 205 performs the noise reduction process on each of the target patches on the basis of the target patch group to generate a noise-reduced patch group. First, the noise reduction processing unit 205 calculates an average patch and a covariance matrix C on the basis of the target patch group. The noise reduction processing unit 205 calculates averages of pixel values of pixels located at the same positions in the target patch group and stores the average values at the respective pixel positions to calculate the average patch. Thus, the shape of the average patch is the same as the shape of the target patch, that is, the average patch is a patch of 4 pixels×4 pixels in the present embodiment. When M denotes the number of pixels in the average patch and Q denotes a column vector in which pixel values of the M pixels are arranged, the noise reduction processing unit 205 calculates the average patch by using Expression (2).

[Math. 2]

$$Q \equiv \frac{1}{N} \sum_{i=1}^{N} P_i \quad (2)$$

Pi denotes an i-th target patch. In addition, the covariance matrix C calculated from the target patch group is a square matrix, and the size of one side is equal to the number of pixels M constituting each target patch. The noise reduction processing unit 205 calculates the covariance matrix C by using the average patch Q and Expression (3).

[Math. 3]

$$C \equiv \frac{1}{N-1} \sum_{i=1}^{N} (P_i - Q)(P_i - Q)^t \quad (3)$$

The covariance matrix C indicates what kind of correlation is present between pixels in the target patch. When two pixels that are adjacent to each other in the patch are focused, the two pixels can be considered to have a correlation if the pixel values are close values or differences therebetween are similar in many target patches.

Further, the noise reduction processing unit 205 calculates a plurality of eigenvalues of the covariance matrix C and eigenvectors corresponding to the respective eigenvalues. The noise reduction processing unit 205 extracts texture components from the target patch group by calculating the eigenvalues and the eigenvectors for the covariance matrix that represents correlations between pixels. In general, a plurality of eigenvalues and a plurality of eigenvectors are present, and the number of eigenvalues and the number of eigenvectors are equal to the size of one side of the covariance matrix. That is, there are as many eigenvalues as and there are as many eigenvectors as the number of pixels M constituting the target patch. In addition, the number of elements of the eigenvector is equal to the number of pixels M constituting the target patch. Here, $\lambda_j$ denotes a j-th eigenvalue, and Ej denotes a j-th eigenvector. The eigenvalue $\lambda_j$ of the covariance matrix C and the eigenvector Ej satisfy a relationship of Expression (4) for the covariance matrix C. That is, the eigenvalue $\lambda_j$ and the eigenvector Ej correspond to each other.

$$CE_j = \lambda_j E_j \quad (4)$$

The noise reduction processing unit 205 calculates the eigenvalue $\lambda_j$ and the eigenvector Ej that satisfy Expression (4). In this case, the eigenvector Ej is equivalent to a texture component extracted in a set of patches similar to one another. In addition, when the texture component represented by the corresponding eigenvector is a texture caused by noise, the eigenvalue $\lambda_j$ is about a variance of noise in the image. The further the value of the eigenvalue becomes greater than the variance of noise, the eigenvector corresponding to the eigenvalue indicates that the eigenvector is more likely to be a texture component of a subject to be originally left in the image. The noise reduction processing unit 205 performs the noise reduction process on each target patch so that the texture component of the subject is left and a texture component caused by noise is removed.

The noise reduction processing unit 205 generates a base matrix B corresponding to each target patch by using Expression (5) on the basis of this eigenvalue and eigenvector.

$$B \equiv (E_1 E_2 \ldots E_M) \quad (5)$$

The base matrix B is a matrix having K rows and M columns. The noise reduction processing unit 205 further performs a projection process on each target patch on the basis of the base matrix B. A coefficient K is set in advance. The coefficient K satisfies 0<K<M, and corresponds to the number of main components that are left as the texture. The noise reduction processing unit 205 derives a projection matrix H from the base matrix B by using Expression (6).

[Math. 4]

$$H \equiv (E_1 E_2 \ldots E_K)^t (E_1 E_2 \ldots E_K) \quad (6)$$

The noise reduction processing unit 205 projects, using the projection matrix H, a difference patch obtained by subtracting the average patch Q from each target patch Pi as indicated by Expression (7) and adds the average patch to the projection result to reduce noise in the target patch. As a result of such correction, a patch Oi in which only the main components are left and noise is reduced is calculated. The processing performed by the noise reduction processing unit 205 is represented as indicated by Expression (7) below.

$$O_i = Q + H(P_i - Q) \quad (7)$$

The noise reduction processing unit 205 stores pixel values of pixels included in each noise-reduced target patch.

In S306, the focused patch setting unit 202 determines whether the focused patch is set for each pixel in the input image. If the focused patch is set for all the pixels serving as the focused pixel, the process proceeds to S307. If there is a pixel that is not set as the focused pixel, the process returns to S302, and the processing is repeated.

In step S307, the image merging unit 206 merges (aggregates) the noise-reduced patch group to generate an output image in which noise included in the input image has been reduced. Specifically, the image merging unit 206 stores the pixel value of each pixel included in the target patch having undergone the noise reduction process at the pixel position where the patch is located before the noise reduction in the image having the same size as the input image. Note that a plurality of pixel values are calculated after the noise reduction process, the pixel value is updated by using the average value of the plurality of pixel values.

The noise reduction process according to the present embodiment ends in this manner. In the present embodiment, a region of 8 pixels×8 pixels is set as the size of the patch in the processing of detecting similar patches that are similar to the focused patch. Thereafter, a partial region of the similar patch which is constituted by 8 pixels×8 pixels is set as the target patch in the processing of performing the noise reduction process on the patch. In the processing of detecting similar patches, the similar patch detection accuracy tends to decrease if the size of the patch is small. A small value of the degree of similarity is calculated even for a reference patch that is not similar to the focused patch.

Thus, when similar patches are detected, similar patches can be more appropriately detected in the case where the number of pixels of the patch is large than in the case where the number of pixels of the patch is small.

On the other hand, as described before, the eigenvalues and eigenvectors calculated from the patch group are equivalent to texture components extracted from a patch. As many eigenvalues and as many eigenvectors as the number of pixels constituting a patch are calculated. Thus, the larger the size of the patch, the more the texture components are extracted. However, if the number of patches is small, it is difficult to extract many texture components that are unique to the patch. In other words, when the number of patches is fixed, the accuracy increases as the number of texture components (eigenvectors) to be extracted decreases. Accordingly, in the present embodiment, in the processing of calculating eigenvalues and eigenvectors for reducing noise in a patch, a patch having a smaller number of pixels than the similar patch is set as the target patch to reduce the number of eigenvalues and the number of eigenvectors to be calculated. In this manner, the eigenvalues and the eigenvectors used in the noise reduction process can be calculated highly accurately. As a result, the appropriate noise reduction process can be performed on the patch group, and as a result more noise in the input image can be reduced.

Note that in the present embodiment, all the pixels are set as the focused pixel, and then aggregation is collectively performed. However, processing of merging patches on which the noise reduction process has been performed up to that point may be repeatedly performed on the input image at predetermined timings. For example, pixels included in a predetermined band region in the input image may be set as the focused pixel. After the processing is completed for all the pixels in the band region, the aggregation may be performed. Alternatively, when a predetermined number of pixel values resulting from the noise reduction process are obtained, the pixel values may be averaged. The pixels may be output sequentially from the pixel for which the average is calculated.

Figure 4C:
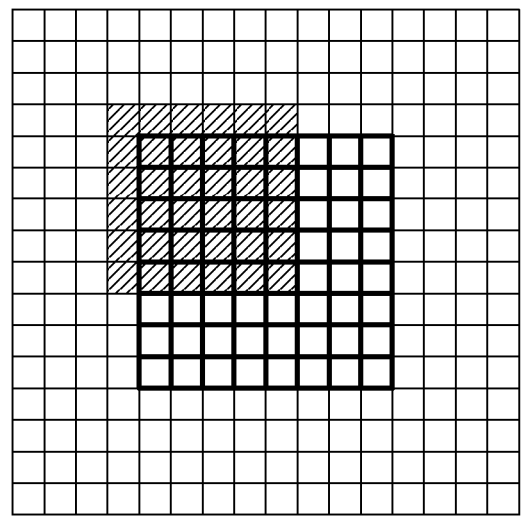
FIG. 4C is a diagram describing a focused pixel, a focused patch, a reference patch, and a target patch.
Figure 4D:
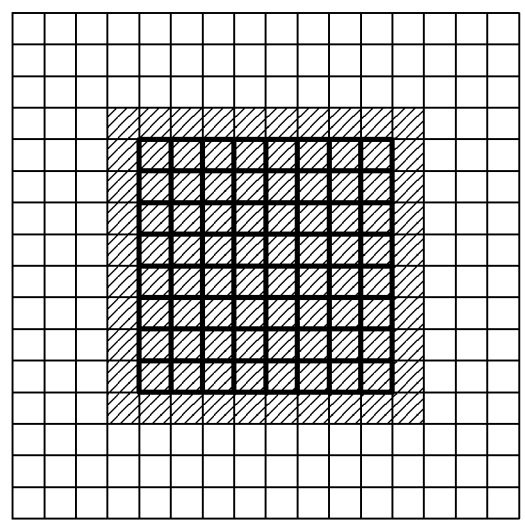
FIG. 4D is a diagram describing a focused pixel, a focused patch, a reference patch, and a target patch.

In addition, in the present embodiment, both the similar patch and the target patch are configured to be quadrangular regions. Alternatively, circular regions or bar-like regions may be used as the patches. In addition, a pixel group including pixels that are not adjacent pixels may be used as the patches. Further, in the present embodiment, the target patch is set to be a partial region of the similar patch. Thus, the target patch is a region that can be regarded to be similar to the focused patch. However, for example, even when a part of the target patch is not included in the similar patch as illustrated in FIG. 4C, the effect can be obtained. When the similar patch is similar to the focused patch, it is highly likely that the peripheral portion of the similar patch is also similar to the peripheral portion of the focused patch. Thus, even when the target patch is set as illustrated in FIG. 4C, the group of target patches can be regarded to be sufficiently similar to each other. In addition, the target patch may be desirably set such that a patch larger than the similar patch is set as the target patch as illustrated in FIG. 4D. For example, when many similar patches are detected, many texture components (eigenvectors) can be accurately calculated even if the number of pixels of the target patch is increased. On the other hand, when many similar patches are detected, the number of patches determined to be similar decreases if the number of pixels of the focused patch is increased and similar patches are detected again. In this case, the noise reduction effect can be increased more by increasing the number of pixels of the target patch to be greater than the number of pixels of the similar patch.

In the first embodiment, the description has been given of the method of setting target patches having the number of pixels different from the number of pixels of similar patches by adjusting the size of the similar patches. In a second embodiment, description will be given of a method of switching between the case where the size of similar patches is not adjusted and the case where the size of similar patches is adjusted in a noise reduction process performed on patches. Note that the hardware configuration of an image processing apparatus is similar to that of the first embodiment. The configurations similar to those of the first embodiments are denoted by the same reference sings, and detailed description thereof is omitted.

Figure 5:
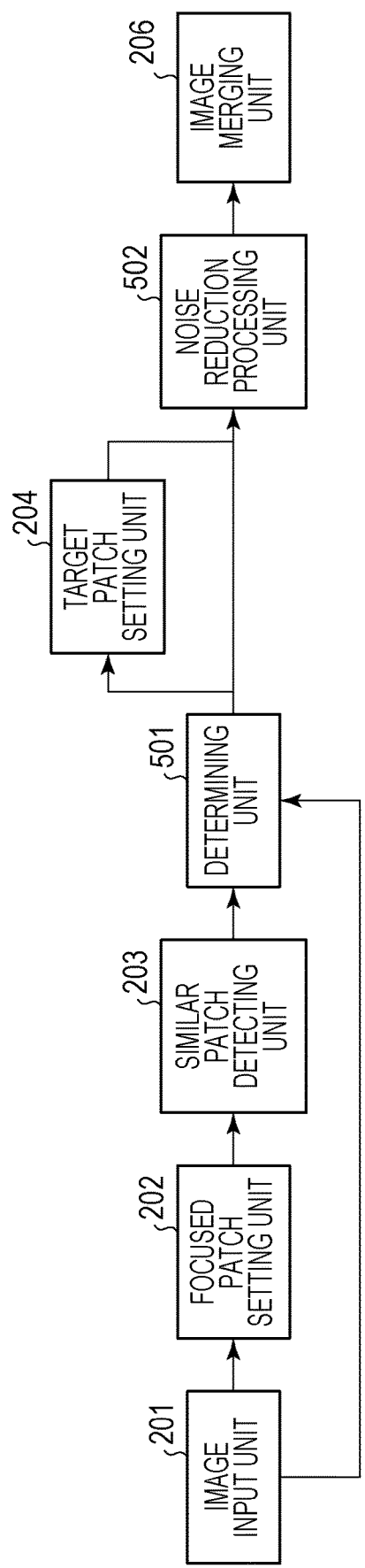
FIG. 5 is a block diagram illustrating a detailed logic configuration of an image processing apparatus.

FIG. 5 is a block diagram illustrating a detailed logic configuration of an image processing apparatus according to the second embodiment. The image processing apparatus includes the image input unit 201, the focused patch setting unit 202, the similar patch detecting unit 203, a determining unit 501, the target patch setting unit 204, the noise reduction processing unit 502, and the image merging unit 206.

The determining unit 501 determines whether or not to set target patches having the number of pixels that is different from that of similar patches when a noise reduction process is performed on a patch group. If the target patches are not to be set, the noise reduction process is performed using a plurality of detected similar patches. That is, this can be said that the similar patches are used as the target patches as they are. In the present embodiment, the determining unit 501 determines whether or not to set the target patches on the basis of a variance of pixel values in a range in which reference pixels are set when respective similar patches are detected and on a variance of noise in the input image. The variance of noise in the input image is calculated in advance on the basis of the input image.

In the case where the target patches are set, a noise reduction processing unit 502 performs the noise reduction process on each target patch on the basis of the target patch group. In addition, in the case where it is determined by the determining unit that the target patches are not to be set, the noise reduction processing unit 502 performs the noise reduction process on each similar patch on the basis of the similar patch group.

Figure 6:
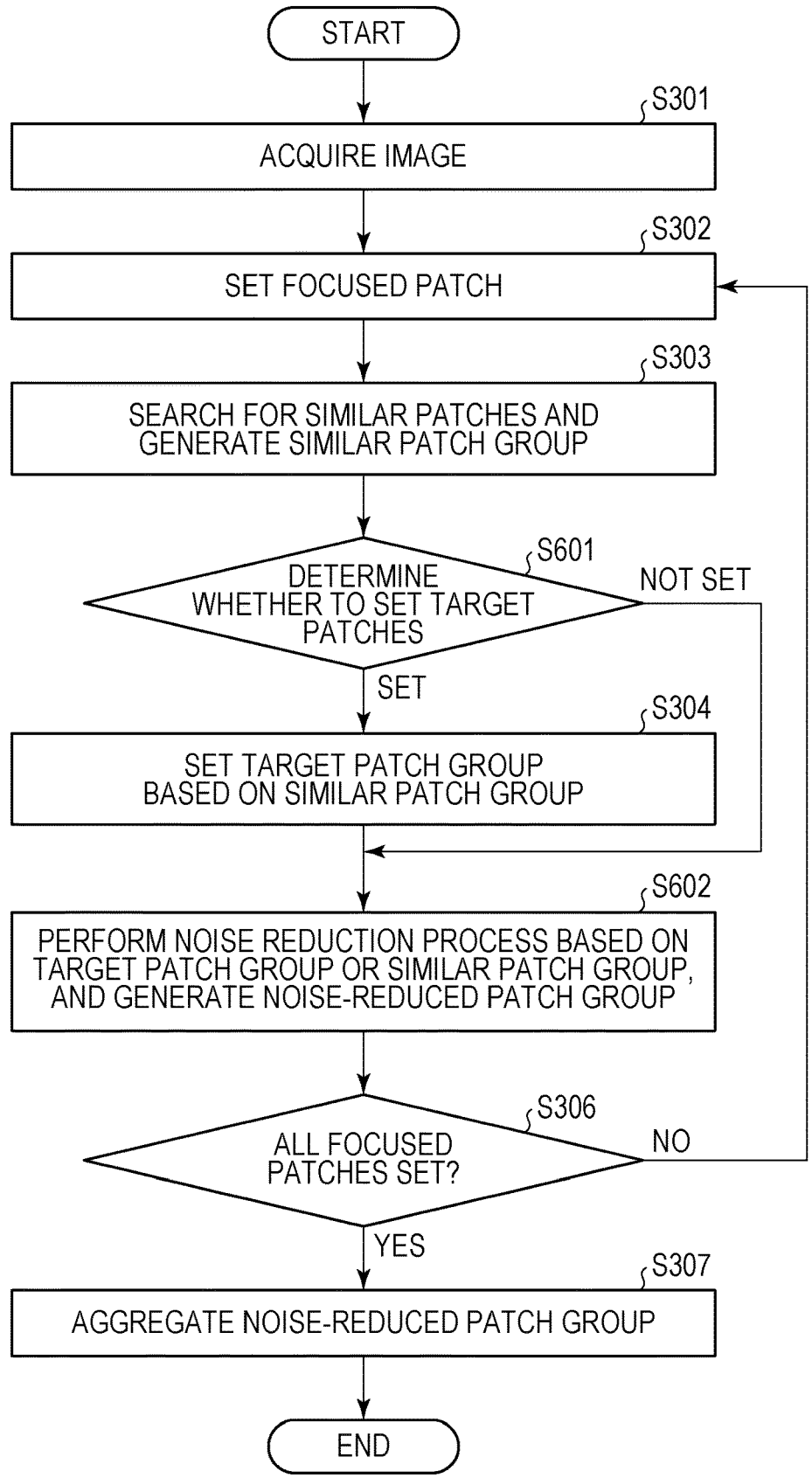
FIG. 6 is a flowchart illustrating a flow of a noise reduction process performed by the image processing apparatus.

FIG. 6 is a flowchart illustrating a flow of the noise reduction process according to the second embodiment. S301, S302, S303, S304, S306, and S307 are the same as those of the first embodiment.

In S601, the determining unit 501 determines whether or not to set the target patches. The determining unit 501 determines whether or not to set the target patches on the basis of a variance of pixel values in a range in which the reference pixels are set. The determining unit 501 first calculates a variance of pixel values on the basis of the pixel values of the respective pixels in a search range (of 15 pixels×15 pixels in this example) in which the reference pixels are set for the focused pixel. If the variance of pixel values of the respective pixels in the search range is greater than the variance of noise of the input image, the determining unit 501 determines to set the target patches having the number of pixels different from that of the similar patches. If the variance of pixel values in the search range is less than or equal to the variance of noise of the input image, the target patches having the number of pixels different from that of the similar patches are not to be set.

Note that if the determining unit 501 determines to set the target patches, partial regions of the similar patches are set as the target patches. If a texture is present, the variance of pixel values is large and the number of detectable similar patches may be small. In the case where the number of similar patches is small, if eigenvalues and eigenvectors similar to those of the first embodiment are calculated on the basis of a similar patch group of similar patches having a large number of pixels, the eigenvectors equivalent to texture components are not to be appropriately calculated. For this reason, to accurately implement a noise reduction process even when the number of detected similar patches is small, the target patches having the number of pixels that is less than the number of pixels of the similar patches are to be set in the present embodiment. On the other hand, if the variance of pixel values is smaller than the variance of noise, the search region is a flat region and it is highly likely that many similar patches can be detected. In the case where many similar patches can be detected, the noise reduction effect is higher in the case where the noise reduction process is performed using patches having a large number of pixels than in the case where the noise reduction process is performed using patches having a small number of pixels. Thus, when the variance of pixel values is sufficiently small, the noise reduction process is performed using the similar patches without setting the target patches having the number of pixels that is less than the number of pixels of the similar patches.

In S602, the noise reduction processing unit 502 performs the noise reduction process on the basis of the target patches in the case where the target patches are set, and on the basis of the similar patches in the case where the target patches are not set. The noise reduction process performed in S602 is similar to that of S305 in the first embodiment. The noise reduction process according to the second embodiment completes in this manner. As described above, by switching between whether or not to make the number of pixels of patches for use in the noise reduction process on each patch different from the number of pixels of patches for use in detection of similar patches, the noise reduction process can be performed depending on the features of the image. In the case where the number of similar patches is large, the noise reduction effect is increased further by performing the noise reduction process by using patches having a large number of pixels. In the case where the number of similar patches is small, noise can be accurately reduced by performing the noise reduction process by using patches having a small number of pixels.

A modification of the second embodiment will be described. In the second embodiment, the configuration is made such that the target patches having the number of pixels that is less than the number of pixels of the similar patches are set in the case where the variance of pixel values is large and such that the target patches are not set in the case where the variance of pixel values is small. On the other hand, a configuration may be made such that the noise reduction process using the similar patches and the noise reduction process using the target patches having the number of pixels greater than that of the similar patches may be switched between. In this case, the determining unit 501 determines to set the target patches having a greater number of pixels than the similar patches if the variance of pixel values is smaller than the variance of noise. The determining unit 501 does not set the target patches if the variance of pixel values is greater than or equal to the variance of noise. By performing the noise reduction process using patches of a larger size in a region in which the larger number of similar patches can be detected, it is possible to prevent low-frequency noise from remaining as a result of the noise reduction process. The determining unit 501 determines whether or not to make the size (the number of pixels) of patches used when the noise reduction process is performed different from the size (the number of pixels) of patches used for detecting the similar patch. In this manner, patches of an appropriate size can be set in each of the processes.

In addition, in the second embodiment, the determining unit 501 determines whether or not to change the size of the patches used in the processing on the basis of the variance of pixel values of pixels included in the search range. However, a pixel group included in the focused patch or in the similar patch group may be used as the range for which the variance of pixels is calculated.

The number of pixels of the patches for use in the noise reduction process is set to be large in the case where the number of similar patches is large, and the number of pixels of the patches for use in the noise reduction process is set to be small in the case where the number of similar patches is small. Thus, in the second embodiment, the variance of pixel values is calculated and it is determined whether a region near the focused pixel is a flat region in which similar patches are more likely to be detected. In another example, the determining unit 501 may determine whether or not to set the target patches by using the number of similar patches or the total number of pixels of the similar patch group. In this case, if the number of similar patches or the total number of pixels of the similar patch group is small, patches having the less number of pixels than the similar patches are set as the target patches. With such a configuration, the effect similar to that of the second embodiment can be obtained. In addition, it is highly likely that many similar patches can be detected if the region is a flat region, whereas it is highly likely that many similar patches cannot be detected if the region is not a flat region. Thus, an edge may be detected in the focused patch or the search range, and the determining unit 501 may determine whether or not to set the target patch depending on the edge.

Further, a configuration may be made such that the determining unit 501 not only determines whether or not to set the target patches but also designates the number of pixels and the shape of the target patches. For example, the determining unit 501 may derive the number of pixels in accordance with the variance of pixel values in a region near the focused pixel and may set the target patches having the derived number of pixels.

In the first and second embodiments, the description has been given of, as the noise reduction process on a patch group, the method of deriving a projection matrix from eigenvalues and eigenvectors of a covariance matrix calculated from the patch group and of using the projection matrix by way of example. However, there is a method of performing a noise reduction process on patches using a covariance matrix instead of a projection matrix, as a patch-based noise reduction process. In the third embodiment, description will be given of a configuration in which the target patches are set in the case where a patch-based noise reduction process is performed using a covariance matrix.

In the third embodiment, the configuration of an image processing apparatus and the flow of a process are similar to those of the first embodiment. However, processing performed by the target patch setting unit 204 in S304 and specific processing performed by the noise reduction processing unit 205 in S305 are different.

First, details of processing of S305 in the third embodiment will be described. Processing up until calculation of a covariance matrix performed by the noise reduction processing unit 205 in S305 is similar to that of the first embodiment. In this case, the noise reduction processing unit 205 calculates a correction matrix H on the basis of the covariance matrix C.

$$H \equiv \sigma^2(E_1 E_2 \ldots E_M)^t \operatorname{diag}(\lambda_1^{-1}, \lambda_2^{-1}, \ldots, \lambda_M^{-1})(E_1 E_2 \ldots E_M) \quad (8)$$

The correction matrix H calculated here is a square matrix whose one side has a size equal to the number of pixels M of the target patch as in the covariance matrix C. The noise reduction processing unit 205 corrects each target patch on the basis of the correction matrix H. Specifically, when Q denotes an average patch and Pi denotes an i-th target patch, the noise reduction processing unit 205 calculates a similar patch Oi that has been corrected using Expression (9) below.

$$O_i \equiv P_i - H(P_i - Q) \quad (9)$$

That is, the second term H(Pi−Q) of Expression (9) is the correction value for the target patch Pi. By subtracting this correction value from the target patch Pi, noise in each similar patch is reduced.

In such a noise reduction process, an inverse matrix of the covariance matrix is used as the correction matrix as indicated by Expression (8). As described above, the covariance matrix is a square matrix of M×M which is the number of pixels of the target patch. To calculate a regular matrix (a matrix from which an inverse matrix can be calculated) as the M×M correction matrix, as many patches as the number of pixels+1 are needed. Thus, in the case where the number of detected similar patches is small, the inverse matrix cannot be derived if the covariance matrix is calculated using similar patches having a large number of pixels. As a result, the noise reduction process may not be performed on patches.

Accordingly, in the third embodiment, the target patch setting unit 204 sets the number of pixels of the target patches in accordance with the number of detected similar patches in S304. Specifically, the target patch setting unit 204 selects as many pixels as the number of detected similar patches−1 from among pixels included in the similar patch and sets the selected pixels as the target patch. Note that the order of pixels selected from the similar patch is held in advance. In this example, the order is an order of proximity to the reference pixel. In addition, in the case where (the number of similar patches−1) is greater than the number of pixels of the similar patch, all the pixels in the similar patch are to be selected. That is, when (the number of pixels of the similar patch+1) or more similar patches can be detected, the similar patches are used as the target patches as they are.

In the case where the number of detected similar patches is small, the accuracy of determining the similar patches decreases if the number of pixels of the similar patches is decreased and similar patches are detected again. Accordingly, in the case where the number of similar patches is small, the number of pixels of the target patches is set in accordance with the number of similar patches. Consequently, the noise reduction process can always be performed on the patch group even if the number of detected similar patches is small.

Note that the case of the third embodiment and the case of using the similar patches in the noise reduction process as they are may be switched between as in the second embodiment.

In addition, in the third embodiment, the description has been given of the method of setting the number of pixels of the target patch in accordance with the number of detected similar patches by way of example. However, as in the first embodiment, patches having the number of pixels that is different from the number of pixels of the similar patches, such as partial regions of the similar patches, may be set as the target patches in advance irrespective of detection of the similar patches.

In the embodiments described above, the description has been given of the method of setting the target patches having the number of pixels different from that of the similar patches for the noise reduction process to be performed on a patch group, and of deriving eigenvalues and eigenvectors of a covariance matrix or a correction matrix from a patch group constituted by the plurality of target patches. In a fourth embodiment, description will be given of a method of performing a noise reduction process on target patches having a number of pixels different from that of similar patches after calculating eigenvalues and eigenvectors of a covariance matrix from a similar patch group. In the fourth embodiment, the configuration of an image processing apparatus and the flow of a process are similar to those of the third embodiment. However, S304 performed by the target patch setting unit 204 and specific processing performed by the noise reduction processing unit 205 in S305 are different.

First, details of processing of S304 in the present embodiment will be described. In S304, the target patch setting unit 204 sets the target patches on the basis of the similar patches. In the present embodiment, the target patch setting unit 204 acquires defect information indicating pixels (hereinafter, referred to as saturated pixels) having a defect such as a shadow-detail loss or a highlight-detail loss in the image. For example, the defect information is information in which information indicating whether each pixel has a shadow-detail loss or a highlight-detail loss is stored. Note that information indicating pixels having a shadow-detail loss or a highlight-detail loss can be detected using a known method. The target patch setting unit 204 refers to the defect information. If the detected similar patch group includes a saturated pixel having a shadow-detail loss or a highlight-detail loss, the target patch setting unit 204 selects only pixels other than the saturated pixel, as pixels constituting the target patches. Note that for all the similar patches of the similar patch group, pixels at the same positions in the patches are selected as the target patches. For example, suppose that only an upper left pixel of one similar patch among the similar patch group is a saturated pixel. In this case, a group of pixels excluding the upper left pixel are set as the target patch for each similar patch included in the similar patch group.

If the target patch group for which a covariance matrix is to be calculated includes a saturated pixel, the variance may abnormally become small or large. This causes artifact to more likely to occur. Accordingly, in the present embodiment, the target patch setting unit 204 sets a patch group excluding the saturated pixel. In addition, in the present embodiment, the patch group is set so that the target patch does not run out of the range of the similar patch.

Next, details of processing of S305 in the fourth embodiment will be described. In S305, the noise reduction processing unit 205 calculates an average patch and a covariance matrix Cr of the similar patches on the basis of the detected similar patch group. The noise reduction processing unit 205 calculates averages of pixel values of pixels located at the same positions in the similar patch group and stores the average values at the respective pixel positions to calculate the average patch of the similar patches. Thus, the shape of the average patch of the similar patches is the same as the shape of the similar patches, that is, the average patch is a patch of 8 pixels×8 pixels in the present embodiment. When R denotes the number of pixels in the average patch of the similar patches and Qr denotes a column vector in which pixel values of R pixels are arranged, the noise reduction processing unit 205 calculates the average patch of the similar patches by using Expression (10).

[Math. 5]

$$Qr \equiv \frac{1}{N}\sum_{i=1}^{N} S_i \qquad (10)$$

$S_i$ denotes an i-th similar patch. In addition, the covariance matrix Cr calculated from the similar patch group is a square matrix, and the size of one side is equal to the number of pixels R constituting the similar patches. The noise reduction processing unit 205 calculates the covariance matrix Cr by using the average patch Qr of the similar patches and Expression (11).

[Math. 6]

$$Cr \equiv \frac{1}{N-1}\sum_{i=1}^{N}(S_i - Qr)(S_i - Qr)^t \qquad (11)$$

In this example, the noise reduction processing unit 205 calculates a correction matrix candidate F by using Expression (11) on the basis of the covariance matrix Cr.

$$F = \sigma^2 (E_1 E_2 \ldots E_R)^t \; \mathrm{diag}(\lambda_1^{-1}, \lambda_2^{-1}, \ldots, \lambda_R^{-1})(E_1 E_2 \ldots E_R) \qquad (11)$$

The correction matrix candidate F calculated here is a square matrix whose one side has a size equal to the number of pixels R of the similar patches as in the covariance matrix Cr. Further, the noise reduction processing unit 205 calculates the correction matrix H on the basis of the correction matrix candidate F. A part extracted from the correction matrix candidate F is the correction matrix H. In the case where the number of pixels of the target patches is M pixels, the correction matrix H is also an M×M square matrix.

Figure 7:
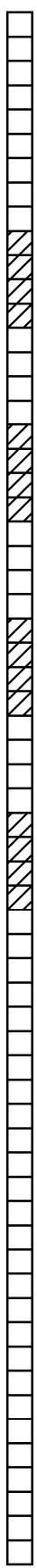
FIG. 7 is a diagram illustrating a positional relationship between a pixel group of a similar patch and a pixel group of a target patch.

The extraction method from the correction matrix candidate F depends on a positional relationship between the similar patch and the target patch. The method of calculating the correction matrix H will be described in detail below on the basis of the correction matrix candidate F. For example, the case where the similar patch and the target patch are in a positional relationship illustrated in FIG. 4A is taken as an example. FIG. 7 illustrates a column vector of the similar patch. The column vector of the similar patch is a vector generated by re-arranging pixels of the similar patch in a rasterization order and arranging pixel values of the respective pixels as elements in a single line. In the case where the similar patch and the target patch are in the positional relationship illustrated in FIG. 4A, elements hatched with diagonal lines in FIG. 7 are also included in the case of generating a column vector of the target patch. That is, the column vector of the target patch is included in a part of the column vector of the similar patch. When setting the target patch, the target patch setting unit 204 generates, as pixel position information, information indicating elements of which numbers are set as the column vector of the target patch among elements of the column vector of the similar patch and holds the pixel position information. In this example, a plurality of numbers which indicate numbers assigned to the elements also included in the target patch (from the start) in the column vector of the similar patch are held as the target patch numbers B. The target patch numbers B include M elements. In the case where the similar patch and the target patch have a relationship illustrated in FIG. 7, the target patch numbers B are calculated to be "10, 11, 12, 13, 18, 19, 20, 21, 26, 27, 28, 29, 34, 35, 36, 37".

The noise reduction processing unit 205 calculates the correction matrix H by extracting only elements included in the target patch numbers B for both the column and the row of the correction matrix candidate F, with reference to the information indicating the target patch numbers obtained from the target patch setting unit 204. For example, in the case where the target patch numbers B are "10, 11, 12, 13, 18, 19, 20, 21, 26, 27, 28, 29, 34, 35, 36, 37", an element in the 10th column and the 10th row is first extracted from the correction matrix candidate F and is set in the 1st column and the 1st row of the correction matrix H. Then, the 11th column and the 11th row of the correction matrix candidate F is set in the 2nd column and the 2nd row of the correction matrix H. The correction matrix H is generated from the correction matrix candidate F by repeating such a process as many times as the target patch numbers B. In addition, the noise reduction processing unit 205 extracts only elements included in the target patch numbers B from the average patch Qr of the similar patches and calculates the average patch Q corresponding to the target patch. The noise reduction processing unit 205 corrects each target patch on the basis of the correction matrix H. Specifically, when Q denotes an average patch and Pi denotes an i-th target patch, the noise reduction processing unit 205 calculates a similar patch Oi that has been corrected using Expression (12) below.

$$O_i = P_i - H(P_i - Q) \qquad (12)$$

The processing performed thereafter is similar to that of the third embodiment. When the similar patch group includes a saturated pixel, the distribution of noise in the similar patch group significantly decreases. Consequently, artifact due to a highlight-detail loss and a shadow-detail loss may occur unless a larger number of patches are detected relative to the number of pixels of the patch than in the usual case. Accordingly, in the present embodiment, when there are pixels of a highlight-detail loss and a shadow-detail loss in a similar patch, target patches excluding those saturated pixels are set. This suppresses the occurrence of artifact and enables the noise reduction process to be performed on each patch more accurately.

Other Embodiments

In the embodiments described above, software implemented through execution of a computer program has been described by way of example. However, part or entirety of each component of the block diagrams illustrated in FIGS. 2 and 5 may be implemented by a dedicated image processing circuit.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising a processor and a memory storing a program which causes the processor to perform:
    setting a focused patch in an input image, the focused patch having a first number of pixels;
    detecting a plurality of similar patches that are similar to the focused patch in the input image;
    setting, based on the plurality of similar patches, a plurality of target patches each including at least one pixel included in a respective similar patch of the plurality of similar patches and having a second number of pixels that is different from the first number of pixels;
    determining which of (a) the plurality of similar patches or (b) the plurality of target patches are to be used as patches subjected to a noise reduction process;
    performing, in a case where it is determined that the plurality of similar patches are to be used, the noise reduction process on the plurality of similar patches, based on the plurality of similar patches; and
    performing, in a case where it is determined that the plurality of target patches are to be used, the noise reduction process on the plurality of target patches, based on the plurality of target patches; and
    merging, to generate an output image, the plurality of target patches whose noise has been reduced by the noise reduction process or the plurality of similar patches whose noise has been reduced by the noise reduction process.

2. The image processing apparatus according to claim 1, wherein the setting the plurality of target patches comprises setting, as each target patch of the plurality of target patches, a patch having the number of pixels that is less than the first number of pixels.

3. The image processing apparatus according to claim 1, wherein the setting the plurality of patches comprises setting, as each target patch of the plurality of target patches, a partial region of a respective similar patch of the plurality of similar patches.

4. The image processing apparatus according to claim 1, wherein the determining comprises determining which of (a) the plurality of similar patches or (b) the plurality of target patches are to be used, based on a distribution of pixel values of pixels included in a region in the input image.

5. The image processing apparatus according to claim 1, wherein the determining comprises determining which of (a) the plurality of similar patches or (b) the plurality of target patches are to be used, based on the number of similar patches.

6. The image processing apparatus according to claim 1, wherein the determining comprises (a) detecting an edge in a region in the input image, and (b) determining, based on the edge in the region, which of (a) the plurality of similar patches or (b) the plurality of target patches are to be used.

7. The image processing apparatus according to claim 1, wherein the performing the noise reduction process on the plurality of target patches comprises (a) calculating an average patch and a covariance matrix of the plurality of target patches, to (b) calculating a base matrix, based on eigenvalues and eigenvectors of the covariance matrix, and (c) performing a projection process on the plurality of target patches using the base matrix to perform the noise reduction process on the plurality of target patches.

8. The image processing apparatus according to claim 1, wherein performing the noise reduction process on the plurality of target patches comprises (a) calculating an average patch and a covariance matrix of the plurality of target patches, and (b) performing the noise reduction process on the plurality of target patches using an inverse matrix of the covariance matrix.

9. The image processing apparatus according to claim 1, wherein the setting the plurality of target patches comprises (a) acquiring defect information indicating whether each pixel has a shadow-detail loss or a highlight-detail loss, and (b) setting each target patch of the plurality of target patches, based on the defect information.

10. The image processing apparatus according to claim 9, wherein the setting the plurality of target patches comprises setting the plurality of target patches such that the plurality of target patches do not include any pixel indicated by the defect information to have a shadow-detail loss or a highlight-detail loss.

11. The image processing apparatus according to claim 1, wherein the setting the plurality of target patches comprises generating pixel position information indicating, for each of the plurality of target patches, a pixel position set as the target patch among a pixel group constituting a respective similar patch of the plurality of similar patches, and
    wherein the performing the noise reduction process on the plurality of target patches comprises performing the noise reduction process on the plurality of target patches based on the pixel position information.

12. The image processing apparatus according to claim 11, wherein the performing the noise reduction process on the plurality of target patches comprises (a) calculating, based on the plurality of similar patches, a first average patch and a correction matrix candidate, (b) calculating, based on the pixel position information, a second average patch and a correction matrix from the first average patch and the correction matrix candidate, and (c) performing the noise reduction process on the plurality of target patches using the second average patch and the correction matrix.

13. The image processing apparatus according to claim 12, wherein the performing the noise reduction process on the plurality of target patches comprises (a) calculating a first covariance matrix, based on the plurality of similar patches, and (b) calculating the correction matrix candidate using the first covariance matrix.

14. The image processing apparatus according to claim 12, wherein the correction matrix candidate is a matrix having a size according to the number of pixels constituting the similar patch, and wherein the correction matrix is a matrix having a size according to the number of pixels constituting the target patch.

15. The image processing apparatus according to claim 1, wherein the similar patch and the target patch are quadrangular regions constituted by a plurality of pixel groups.

16. A non-transitory computer-readable medium storing a program which, when executed by a computer comprising a processor and a memory, causes the computer to perform:

setting a focused patch in an input image, the focused patch having a first number of pixels;

detecting a plurality of similar patches that are similar to the focused patch in an input image;

setting, based on the plurality of similar patches, a plurality of target patches each including at least one pixel included in a respective similar patch of the plurality of similar patches and having a second number of pixels that is different from the first number of pixels;

determining which of (a) the plurality of similar patches or (b) the plurality of target patches are to be used as patches subjected to a noise reduction process;

performing, in a case where it is determined that the plurality of similar patches are to be used, the noise reduction process on the plurality of similar patches, based on the plurality of similar patches;

performing, in a case where it is determined that the plurality of target patches are to be used, the noise reduction process on the plurality of target patches, based on the plurality of target patches; and merging, to generate an output image, the plurality of target patches whose noise has been reduced or the plurality of similar patches whose noise has been reduced.

17. An image processing method comprising:

setting a focused patch in an input image, the focused patch having a first number of pixels;

detecting a plurality of similar patches that are similar to the focused patch in an input image;

setting, based on the plurality of similar patches, a plurality of target patches each including at least one pixel included in a respective similar patch of the plurality of similar patches and having a second number of pixels that is different from the first number of pixels;

determining which of (a) the plurality of similar patches or (b) the plurality of target patches are to be used as patches subjected to a noise reduction process;

performing, in a case where it is determined that the plurality of similar patches are to be used, the noise reduction process on the plurality of similar patches, based on the plurality of similar patches;

performing, in a case where it is determined that the plurality of target patches are to be used, the noise reduction process on the plurality of target patches, based on the plurality of target patches; and merging, to generate an output image, the plurality of target patches whose noise has been reduced or the plurality of similar patches whose noise has been reduced.

18. The image processing method according to claim 17, wherein the second number of pixels is less than the first number of pixels.

19. The image processing method according to claim 17, wherein partial regions of the plurality of similar patches are set as the plurality of target patches.

* * * * *